Sept. 16, 1958  M. K. ERIKSEN  2,851,726
MOLD
Filed June 5, 1953  3 Sheets-Sheet 3
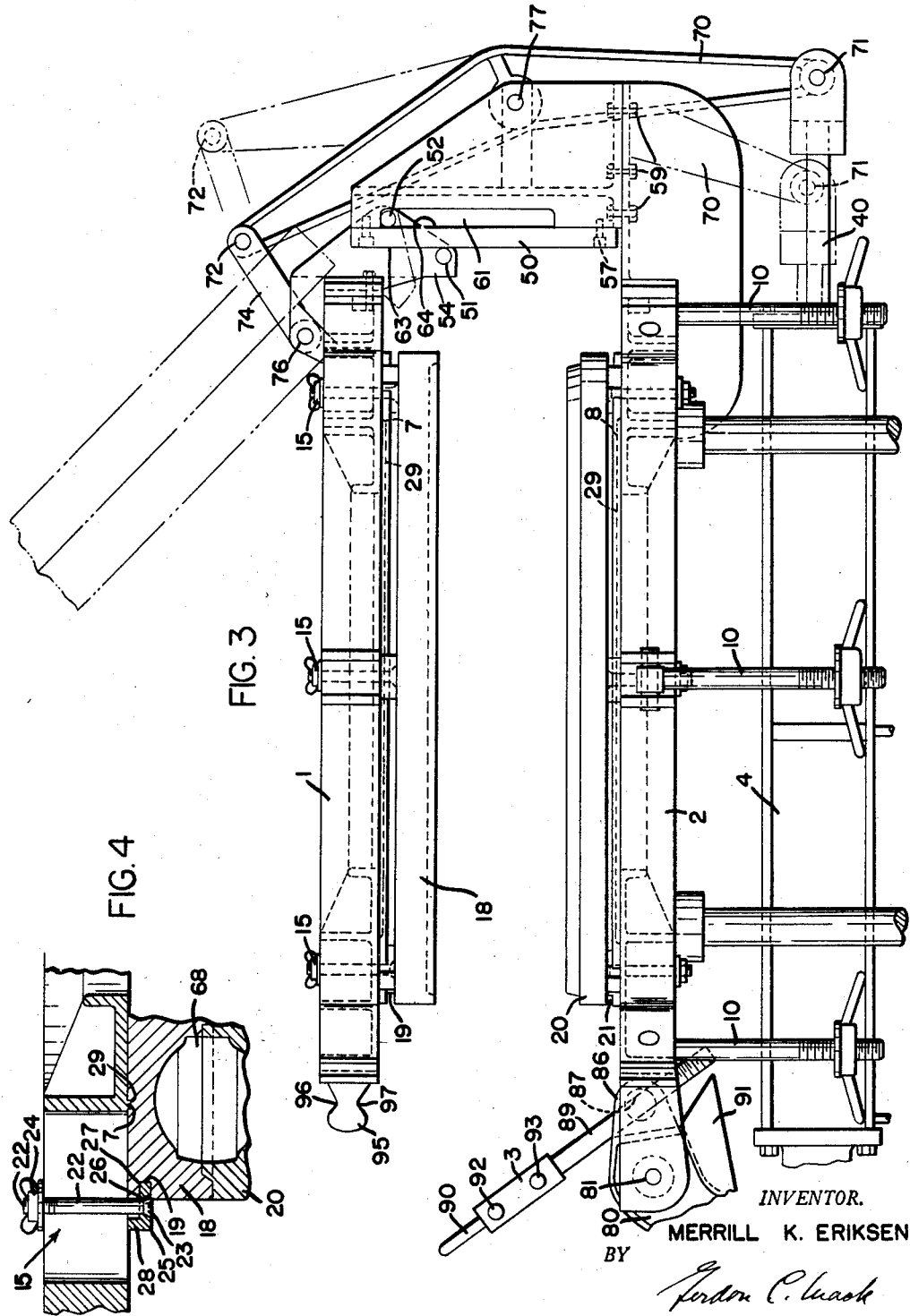
INVENTOR.
MERRILL K. ERIKSEN
BY
Gordon C. Mack
ATTY.

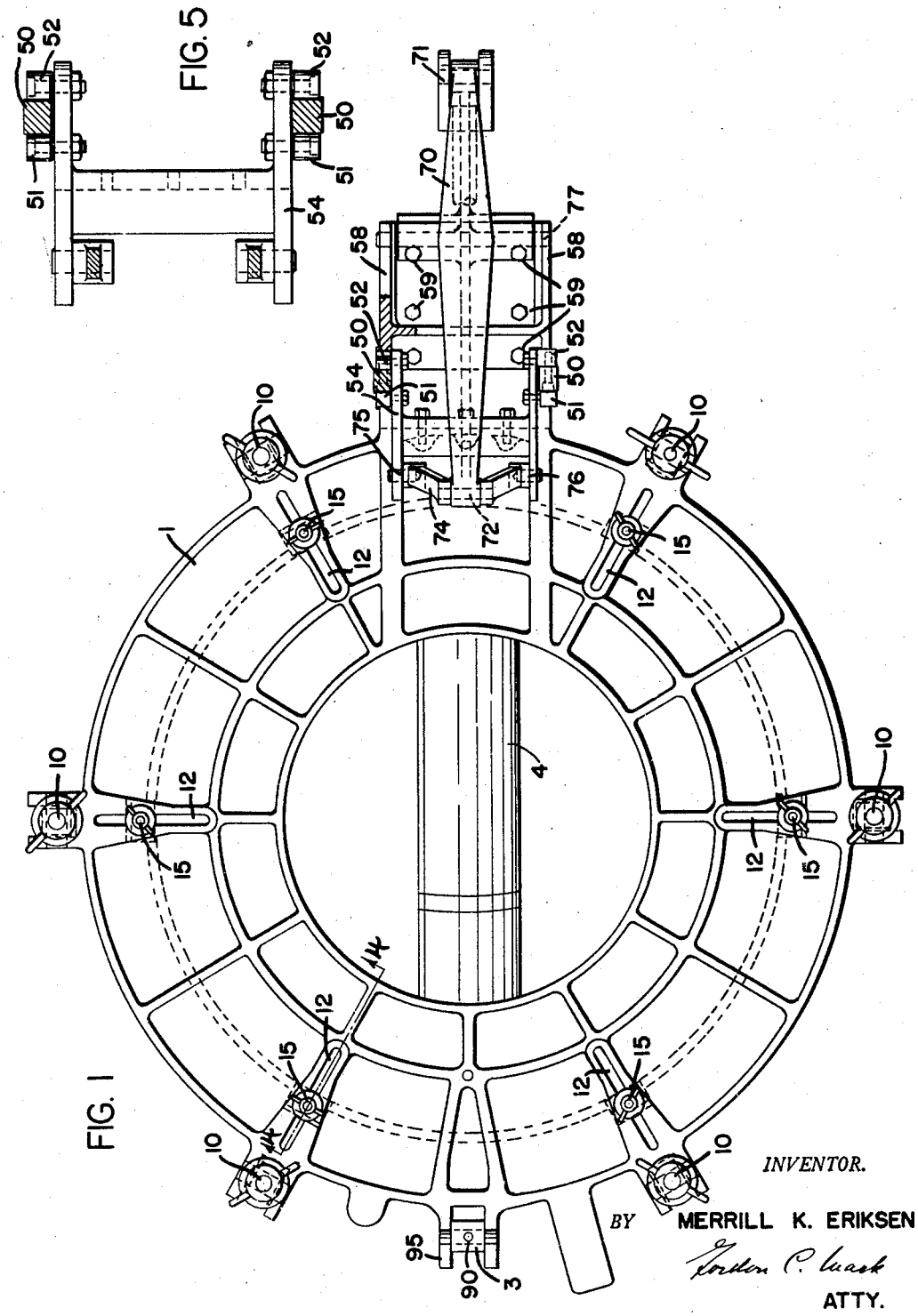

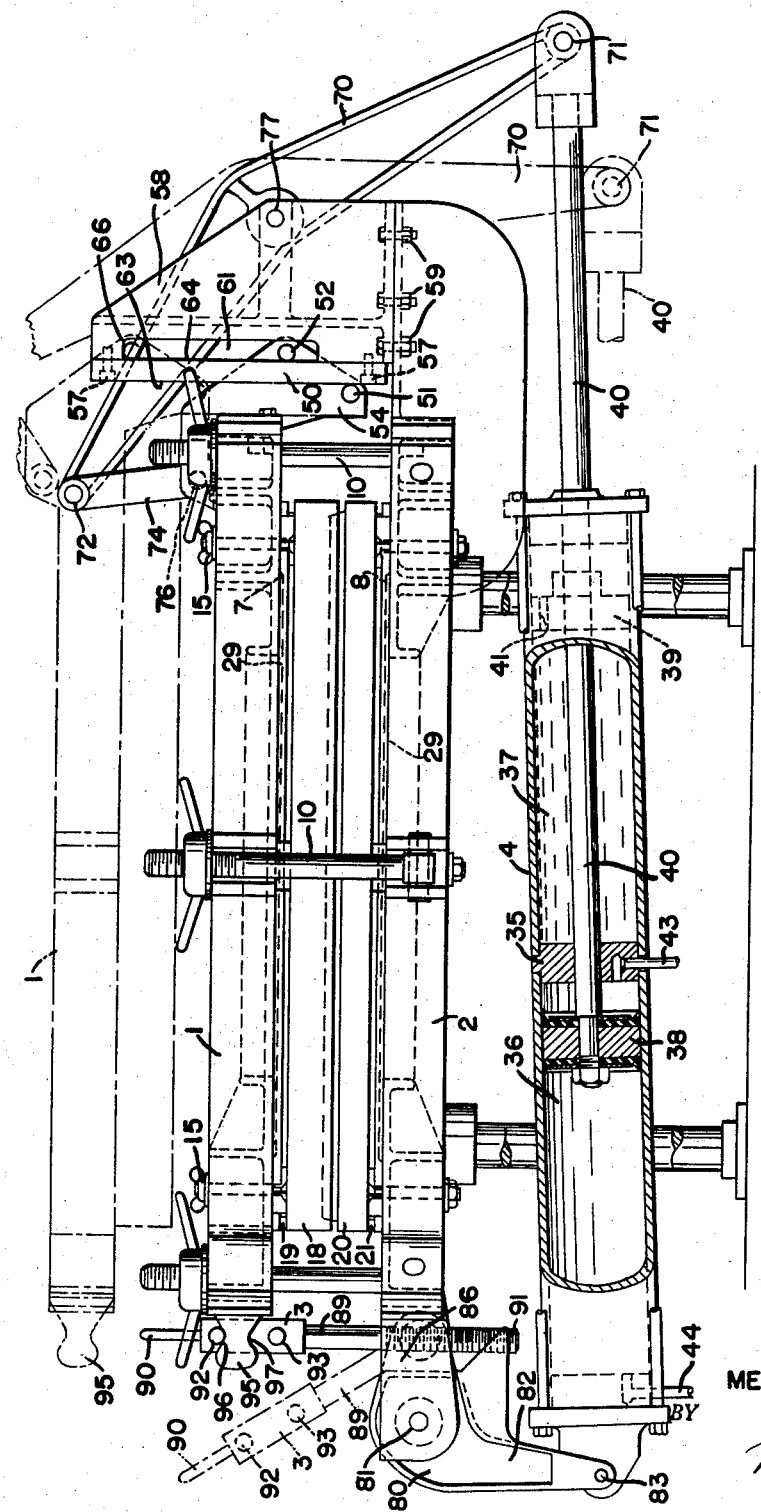

United States Patent Office 2,851,726
Patented Sept. 16, 1958

2,851,726
MOLD

Merrill K. Eriksen, Bay Village, Ohio, assignor, by mesne assignments, to The James C. Heintz Company, Cleveland, Ohio, a corporation of Ohio Application June 5, 1953, Serial No. 359,802

2 Claims. (Cl. 18—18)

This invention relates to a mold designed particularly for retreading tires. The invention relates more particularly to mechanism which maintains the platens parallel as they are separated when starting to open the mold for removal of a tire therefrom and then tilts one of the platens, and conversely maintains the platens parallel as they are closed on one another.

In using the mold, the tire is prepared for retreading in any desirable manner. The invention relates more particularly to a mold in which the lower platen is stationary and only the upper platen is movable. When the tire is in the matrix on the lower platen, the upper platen with matrix attached is lowered on it. The movement of the upper platen is controlled by cams and a cam guide, and as the upper matrix closes on the lower matrix, the upper platen is horizontal. This prevents displacement of the tire in the mold cavity as frequently happens when the platens are not parallel as the mold is closed.

The same cam mechanism holds the upper platen horizontal as the mold is broken after the repair of the tire, and the upper platen is lifted from the lower platen. However, after the matrices have been separated sufficiently, the cam mechanism tilts the upper platen backwardly.

The cam mechanism which effects this movement includes a cam guide with opposed parallel surfaces and a cam which contacts each. The guide is fastened to the lower platen or to the mold support, or it might be separately mounted on the floor. The cams are supported by the upper platen and move upwardly as this platen is lifted. There is a stop which limits the upward movement of one of the cams along the guide without interfering with the movement of the other cam. When the cam contacts this support, as the platen is lifted, the platen tilts backwardly giving open access to the mold cavity. When the mold is closed the movement of the upper platen is reversed. It first levels off, so that as the matrices come together the upper platen is horizontal and therefore parallel with the lower platen.

The invention will be further discussed in connection with the accompanying drawings, in which—

Fig. 1 is a plan view of the mold, partly broken away;

Fig. 2 is a side view partly in section; with an alternative position of the mold breaker shown in dot-dash lines; and also showing in dot-dash lines the upper platen partially raised, together with the position of the operating mechanism when the platen is in this position;

Fig. 3 shows in full lines the upper platen in the lifted position in which it is shown in dot-dash lines in Fig. 2, and it also shows the upper platen tilted up and the position of the operating mechanism when the platen is so tilted;

Fig. 4 is a detail showing the device for holding the matrices against the platens; and Fig. 5 is a detail showing the relation of the cams and cam guides.

The mold includes the movable upper platen 1, the stationary lower platen 2, the mold breaker 3 and the cylinder 4 which lifts and lowers the upper platen and operates the mold breaker. The lower surface of the upper platen and the upper surface of the lower platen are substantially flat, although they include the matrix centering rings 7 (Fig. 4) and 8 which will be described in more detail in what follows. In the mold shown the platens are not dished to receive matrices, as is customary, but are generally flat. The matrices include heaters heated either by electricity or steam. So far as the lifting mechanism is concerned the platens may be of any suitable design. The usual clamp bolts 10 are pivoted to the lower platen.

There are radial slots 12 (Fig. 1) in both the upper and lower platens, and these hold the matrix-fastening devices 15. A detail of these is shown in Fig. 4. They are slidable in the slots 12 so that they may be used on matrices of different diameters. These matrix fasteners fit into grooves in the matrices. The groove 19 provided for this purpose is near the upper edge of the upper matrix and in the lower matrix 20 the groove 21 is near the bottom edge. Each fastener includes a bolt 22 with a head 23 and a nut 24. Loosely fitted on the bolt is the angle 25. In the lower arm of the angle is the hole 26 through which the bolt passes. In using the matrix fastener the edge 27 of the lower arm is placed in the groove in a matrix and then the nut 24 is tightened. The upper arm 28 of the angle is thus braced against the platen. When the nut is drawn tight against the platen the angle 25, although it fits loosely around the bolt, is held tight in the groove in the matrix and holds the matrix tight against the platen, whether it be an upper or lower platen.

A circular groove 29 is machined in the back surface of each matrix. The centering rings of the platens 7 and 8 fit into these. The diameter of this groove is the same regardless of the size of the matrix so that matrices of different sizes may be used interchangeably in the mold. Although the preferred means for centering the matrices in the mold is an annular centering ring on the platen and a circular groove in the matrix, it is readily appreciated that the groove may be in the platen surface and the ring on the matrix. Alternatively, instead of a groove a circle the size of the outside diameter of the centering ring may be used, and instead of an annular ring a circular boss may be employed. The centering means are preferably circular although the matrix and platen may be provided with complementary surface irregularities of other configurations for this purpose.

The cylinder 4 floats between the mold breaker 3 at the front of the mold and the platen-lifting mechanism at the rear of the mold. It is divided at its center by the partition 35. This separates the air compartment 36 from the oil compartment 37. The piston head 38 operates in the air compartment and the piston head 39 operates in the oil compartment. Both piston heads are attached to the piston rod 40. There is an opening 41 in the piston head 39. The cylinder is operated by introducing air under pressure into the air compartment 36 through the connection 43. This draws the piston rod into the cylinder. When this air is vented through the same connection 43, the weight of the upper platen pulls the piston rod out of the cylinder. Nevertheless, air is introduced into the cylinder through the connection 44 as the platen is being lowered in order to operate the mold breaker, as will be explained. In order to accomplish these operations, the connections 43 and 44 are connected with a source of compressed air, and are also equipped with valve means to exhaust the air from the cylinder to the atmosphere.

The oil chamber acts to cushion the movement of the cylinder. Regardless of the direction of movement of the piston rod, oil moves through the opening 41, passing from one side of the piston head 39 to the other. Thus the movement of the piston head 39 and piston rod is dampened. The oil is never removed from the compartment 37. This gives the advantages of an oil cylinder but the oil is entirely contained and there is no leakage so that the cylinder also has the advantages of being operated by air.

The mold is provided with cam mechanism which holds the platens horizontal as they are being separated and then tilts the upper platen back. Conversely, when the mold is being closed the upper platen is first brought to a horizontal position and then it is held horizontal as the mold closes. This cam mechanism includes the cam guides 50 fastened to the lower platen and the front and rear cam rollers 51 and 52 which project outwardly from the plates 54 which are fastened to the upper platen. The cam guides 50 are bolted by the bolts 57 to forwardly extending projections at the top and bottom of both sides of the frame 58 which is bolted to the lower platen by the bolts 59. Between these projections are the openings or guideways 61 in which one of the cam rollers 52 moves up and down. The front surfaces 63 and rear surfaces 64 of the cam guides 50 are vertical. As the upper platen is lifted the front cams 51 follow the front surfaces 63, and the rear cams 52 follow the rear surfaces 64 until the rear cams hit the stops 66 at the top of the respective guideways 61. The respective cams 51 and 52 are not directly opposite one another, but the front cams are below the back cams. The weight of the upper platen tends to keep the front cams in contact with the front surfaces 63 of the cam guides but when the lifting movement is continued, after the cams 52 hit the stops 66, the front cams 51 no longer contact the surfaces 63 but are thrown forward and upward, as the upper platen is tilted backwardly (Fig. 3). The upper platen is held in this position while the tire is removed from the molding cavity 68 (Fig. 4) and a new tire is inserted, or while the matrices are changed, etc.

The upper platen is lifted by drawing the piston rod 40 into the cylinder. The lower end of the lifting lever 70 is pivotally fastened to the outer end of the piston rod at 71, and the other end is pivotally fastened at 72 to the links 74 which in turn are pivotally fastened at 75 and 76 (Fig. 1) to the upper platen. The lever is pivoted to the lower platen at 77. As the piston rod is drawn into the cylinder the upper platen, guided by the cam mechanism, is lifted first horizontally and then tilted backwardly. When the upper platen is lowered, the forward part falls until the cams 51 contact the front surfaces 63 of the cam guides. The cam mechanism then becomes effective and holds this upper platen horizontal until the mold is closed.

The mold breaker lever 80 is pivoted to the front of the lower platen at 81. It includes the downwardly depending arm 82 which is pivotally attached to the front of the cylinder at 83. The other arm 86 extends backwardly and is bifurcated. The block 87 is pivotally fastened between the two portions of this arm and the rod 89 is threaded into it. By turning the rod 89 in and out of the block 87 its effective length is adjusted to accommodate the mold-breaking action to matrices of different thickenesses. The mold breaker 3 is fastened at the top of the rod 89, and the handle 90 is provided to swing the mold breaker about the pivoted block 87, either to bring it forward out of engagement with the upper platen or to push it upwardly to engage it with the upper platen. The stop 91 limits the upward movement of the mold breaker.

Extending from both sides of the mold breaker are upper and lower studs 92 and 93 respectively. In the raised position the mold breaker 3 fits between the two ears 95 which project forwardly from the front of the upper platen. There is a notch 96 in the top of each of these ears, and a notch 97 in the lower surface of each ear. The operation of the mold breaker will be described in connection with the general operation of the mold, which now follows.

In operating the mold the upper platen is first lifted and tilted back. The lower matrix 20 is then placed on the lower platen and properly located by means of its centering ring. The lower matrix fasteners 15 are then tightened to hold this matrix in place. The upper matrix is then placed on the lower matrix. The upper platen is then lowered into contact with the upper matrix. The centering ring 7 on the upper platen fits into the groove 29 in the top surface of the upper matrix. The upper matrix fasteners 15 are then tightened. The mold is then ready for use.

The upper platen is lifted. The tire prepared in the usual way and with the camelback affixed is placed in the mold cavity of the lower matrix. The upper platen is then lowered. It levels off to the horizontal position before it comes in contact with the tire. Just after it contacts the tire the mold breaker 3 is lifted by the handle 90 into position between the ears 95. As the lowering of the upper platen continues it is held horizontal by the cams 51 and 52 and the cam guides 50. The cylinder 4 floats between the pivot points 71 and 83. The upper platen is lowered of its own weight until it rests on the top of the tire which is to be retreaded.

While the upper platen is being lowered of its own weight it pulls the piston rod 40 out of the cylinder and the air introduced into the cylinder pushes the arm 82 of the mold breaker lever forwardly and lowers its arm 86. This pulls the mold breaker down. As explained, just after the upper platen comes in contact with the tire the mold breaker is manually swung upwardly so that the ears 95 pass between the studs 92, 93 and studs 92 engage the notches 96. Then as the operation continues, the cams 51 and 52 pressing against the guides 50 hold the upper platen horizontal as it is lowered on to the lower matrix and the mold breaker is drawn downwardly so that the studs 92 pull the ears 95 down. This prevents the front of the horizontal upper platen from tipping upwardly as the platen presses onto the tire. Thus the upper platen is maintained in a horizontal position until the two matrices come in contact and the mold is closed. The clamp bolts 10 are then swung up and tightened and the tread is cured.

After the retreading is completed the operation is reversed. Air is introduced through the connection 43 and this draws the piston rod into the cylinder. This actuates the breaker lever 80 first, because this requires less work. The arm 86 of the mold breaker pushes the studs 93 against the under surfaces of the ears 95 breaking the front of the matrix from the tire. The studs 93 lift the ears 95 until stop 91 prevents further movement. At this time lever 70 is actuated, moving the rear of the platen upwardly. As soon as the ears 95 are lifted off the studs 93, the mold breaker is manually swung out of its operative position. The lifting movement continues, first raising the platen in a horizontal plane, then tilting it backwardly. The backward tilting of the upper platen continues until the piston rod is drawn into the cylinder. This completes the mold cycle. If the same matrices are to be used for another tire the other tire is immediately inserted in the mold cavity when the operation is completed. If different matrices are required the mold is closed, the matrix fasteners for both the upper and lower matrix are loosened, the mold is again opened, the matrices are removed, and new matrices are inserted.

It is to be understood that the matrices may be heated by steam or electricity, and for this reason no heating connections are shown in the drawings. The cylindrical surface of each matrix is preferably a cover which is formed in several parts and which on removal reveals a cavity containing either an electrical heating device or steam coils. Appropriate connections, switches, etc. are provided for supplying steam or electricity, and the temperature is controlled by a thermostat (not shown).

Although the mechanism for lifting the upper platen is shown in connection with a mold in which the lower platen is stationary, it is obvious that the movement of the upper platen may be controlled as described, regardless of the movement of the lower platen. If the lower platen is to be controlled by like cam mechanism the cam stop which causes the tilting of the platen will be located at the bottom of the cam surface. The stop will also be located at the bottom of the cam surface if the cam mechanism is located rearwardly of the pivot point 77.

The mold accommodates matrices of different sizes which may be heated by either steam or electricity. Not only is the upper platen kept horizontal by the cam mechanism as it closes the mold cavity and opens it, but the mold breaker assists, particularly in preventing the front of the upper platen from being raised as the platen is lowered against the tire in the mold cavity. The use of power for complete closing and opening greatly reduces the time required for loading and unloading a tire in the mold. The matrices may be designed for top capping, full capping, or any combination thereof, and inside curing rims may be used if desired.

What I claim is:

1. A mold with a stationary lower platen and a liftable upper platen, a cylinder floating in a substantially horizontal position below the lower platen, a piston in the cylinder with the piston rod extending rearwardly from the cylinder and fluid connections for moving the piston longitudinally of the cylinder, a platen-lifting arm pivoted intermediate its ends on the rear of the lower platen, one end of said arm being connected to the piston rod and the other end being pivotally connected to one end of a link the other end of which is pivotally attached to the rear of the upper platen, a cam guide on the top of the rear of the lower platen forward of the location at which the platen-lifting arm is pivoted, said guide having perpendicular front and rear surfaces, a cam roller contacting each surface, said cam rollers being rigidly supported by the upper platen with the front roller below the back, a stop at the top of said rear guide surface which terminates the movement of the cam roller contacting said surface, a generally right-angular breaker lever pivoted at its right angle to the front of the lower platen and having a downwardly extending arm connected to the front end of the cylinder and a short inwardly extending arm, a mold-breaker rod the lower end of which is threaded into said short arm whereby it is of adjustable length and which is pivotally supported in the short arm so that it may be positioned vertically and inclined forwardly, a breaker at the top of said rod having a pair of vertically spaced studs on each side thereof, said studs being opposite one another, and spaced projections at the front of the upper platen between which the breaker is adapted to fit and oppositely located indentations at the top and bottom of said projections into which said studs are adapted to fit when the rod is lowered and raised, respectively.

2. A mold with a stationary lower platen and a liftable upper platen, an assembly of a cylinder with its piston rod floating under the lower platen, mechanism for lifting the upper platen connecting the upper platen and the rear of said assembly, an angular mold-breaker lever pivoted at the front of the lower platen with its first arm extending toward the matrices and its second arm connected with the front of said assembly, a breaker rod pivotally attached at one end to said first arm and being of adjustable length and having a mold breaker at the other end thereof, whereby the rod is adapted to be raised and lowered as said second arm is drawn rearwardly and pushed forwardly by operation of said cylinder, and spaced projections from the front of the upper platen with oppositely located depressions in the top and bottom of each, said mold breaker being adapted to be positioned between said projections and having a pair of studs on each side thereof, the upper studs being adapted to be engaged in the upper depressions and the bottom studs being adapted to be engaged in the lower depressions, respectively, as the mold breaker is lowered and raised by movement of the lever as the assembly is operated, the extent of the movement of the assembly in operating the mold breaker being limited by the pivoting of the mold-breaker lever whereas there is greater movement of the assembly in operating the platen-lifting mechanism.

References Cited in the file of this patent

UNITED STATES PATENTS

| | | |
|---|---|---|
| 1,947,335 | De Mattia | Feb. 13, 1934 |
| 1,989,362 | Iverson | Jan. 29, 1935 |
| 2,174,188 | Heintz | Sept. 26, 1939 |
| 2,343,641 | Brundage | Mar. 7, 1944 |
| 2,495,663 | Soderquist | Jan. 24, 1950 |
| 2,638,629 | Heintz | May 19, 1953 |